United States Patent
Doshi et al.

(10) Patent No.: US 10,481,798 B2
(45) Date of Patent: Nov. 19, 2019

(54) EFFICIENT FLASH MANAGEMENT FOR MULTIPLE CONTROLLERS

(71) Applicant: PURE STORAGE, INC., Mountain View, CA (US)

(72) Inventors: Nidhi Pankaj Doshi, Mountain View, CA (US); Eric D. Seppanen, Mountain View, CA (US); Neil Buda Vachharajani, San Francisco, CA (US)

(73) Assignee: Pure Storage, Inc., Mountain View, CA (US)

( * ) Notice: Subject to any disclaimer, the term of this patent is extended or adjusted under 35 U.S.C. 154(b) by 345 days.

(21) Appl. No.: 15/337,151

(22) Filed: Oct. 28, 2016

(65) Prior Publication Data
US 2018/0121088 A1    May 3, 2018

(51) Int. Cl.
*G06F 12/00*    (2006.01)
*G06F 3/06*    (2006.01)
*G06F 12/02*    (2006.01)

(52) U.S. Cl.
CPC .............. *G06F 3/061* (2013.01); *G06F 3/064* (2013.01); *G06F 3/0688* (2013.01); *G06F 12/0246* (2013.01); *G06F 2212/1016* (2013.01); *G06F 2212/7202* (2013.01); *G06F 2212/7207* (2013.01)

(58) Field of Classification Search
USPC ................................. 711/103, 154; 714/704
See application file for complete search history.

(56) References Cited

U.S. PATENT DOCUMENTS

| | | |
|---|---|---|
| 6,286,056 B1 | 9/2001 | Edgar et al. |
| 6,804,703 B1 | 10/2004 | Allen et al. |
| 6,954,881 B1 | 10/2005 | Flynn, Jr. et al. |
| 7,139,907 B2 | 11/2006 | Bakke et al. |
| 7,272,674 B1 | 9/2007 | Nandi et al. |
| 7,313,636 B2 | 12/2007 | Qi |
| 7,577,802 B1 | 8/2009 | Parsons |
| 8,103,754 B1 | 1/2012 | Luong et al. |
| 8,301,811 B1 | 10/2012 | Wigmore et al. |
| 8,645,649 B2 | 2/2014 | Kaiya et al. |
| 9,063,937 B2 | 6/2015 | McDowell et al. |
| 9,294,567 B2 | 3/2016 | Hussain et al. |
| 9,430,412 B2 | 8/2016 | Huang |

(Continued)

OTHER PUBLICATIONS

Ouyang, J. et al. (Mar. 1-5, 2014) "SDF: Software-Defined Flash for Web-Scale Internet Storage Systems", ASPLOS 2014, 14 pages.

(Continued)

*Primary Examiner* — Mardochee Chery
(74) *Attorney, Agent, or Firm* — Womble Bond Dickinson (US) LLP; Daniel E. Ovanezian

(57) ABSTRACT

A storage controller coupled to a storage array comprising one or more storage devices receive a request to write data to one of the storage devices. The storage controller determines a first data block on the storage device comprising a list of deallocated data blocks on the storage device, the list comprising a block number of each deallocated data block and an access operation count value at which each deallocated data block was deallocated. The storage controller identifies a second data block from the list of deallocated data blocks on the storage device based on a corresponding access operation count value from the list and writes the data to the second data block.

6 Claims, 6 Drawing Sheets

(56) References Cited

U.S. PATENT DOCUMENTS

| | | |
|---|---|---|
| 9,501,245 B2 | 11/2016 | Hussain et al. |
| 9,565,269 B2 | 2/2017 | Malwankar et al. |
| 2008/0034167 A1 | 2/2008 | Sharma et al. |
| 2010/0313084 A1* | 12/2010 | Hida .................. G06F 11/1068 714/704 |
| 2012/0072680 A1* | 3/2012 | Kimura ................ G06F 11/108 711/154 |
| 2015/0019798 A1 | 1/2015 | Huang |
| 2015/0370701 A1* | 12/2015 | Higgins ............. G06F 12/0253 711/103 |
| 2017/0024166 A1 | 1/2017 | Singh et al. |

OTHER PUBLICATIONS

Zhang, J. et al. (2016) "Application-Aware and Software-Defined SSD Scheme for Tencent Large-Scale Storage System" 2016 IEEE 22nd International Conference on Parallel and Distributed Systems, 482-490.

"Open-Channel Solid State Drives NVMe Specification" (Apr. 2016), 24 pages.

\* cited by examiner

EFFICIENT FLASH MANAGEMENT FOR MULTIPLE CONTROLLERS

BACKGROUND

As computer memory storage and data bandwidth increase, so does the amount and complexity of data that businesses manage daily. Large-scale distributed storage systems, such as data centers, typically run many business operations. A datacenter, which also may be referred to as a server room, is a centralized repository, either physical or virtual, for the storage, management, and dissemination of data pertaining to one or more businesses. A distributed storage system may be coupled to client computers interconnected by one or more networks. If any portion of the distributed storage system has poor performance, company operations may be impaired. A distributed storage system therefore maintains high standards for data availability and high-performance functionality.

BRIEF DESCRIPTION OF THE DRAWINGS

The present disclosure is illustrated by way of example, and not by way of limitation, in the figures of the accompanying drawings.

DETAILED DESCRIPTION

Figure 1:
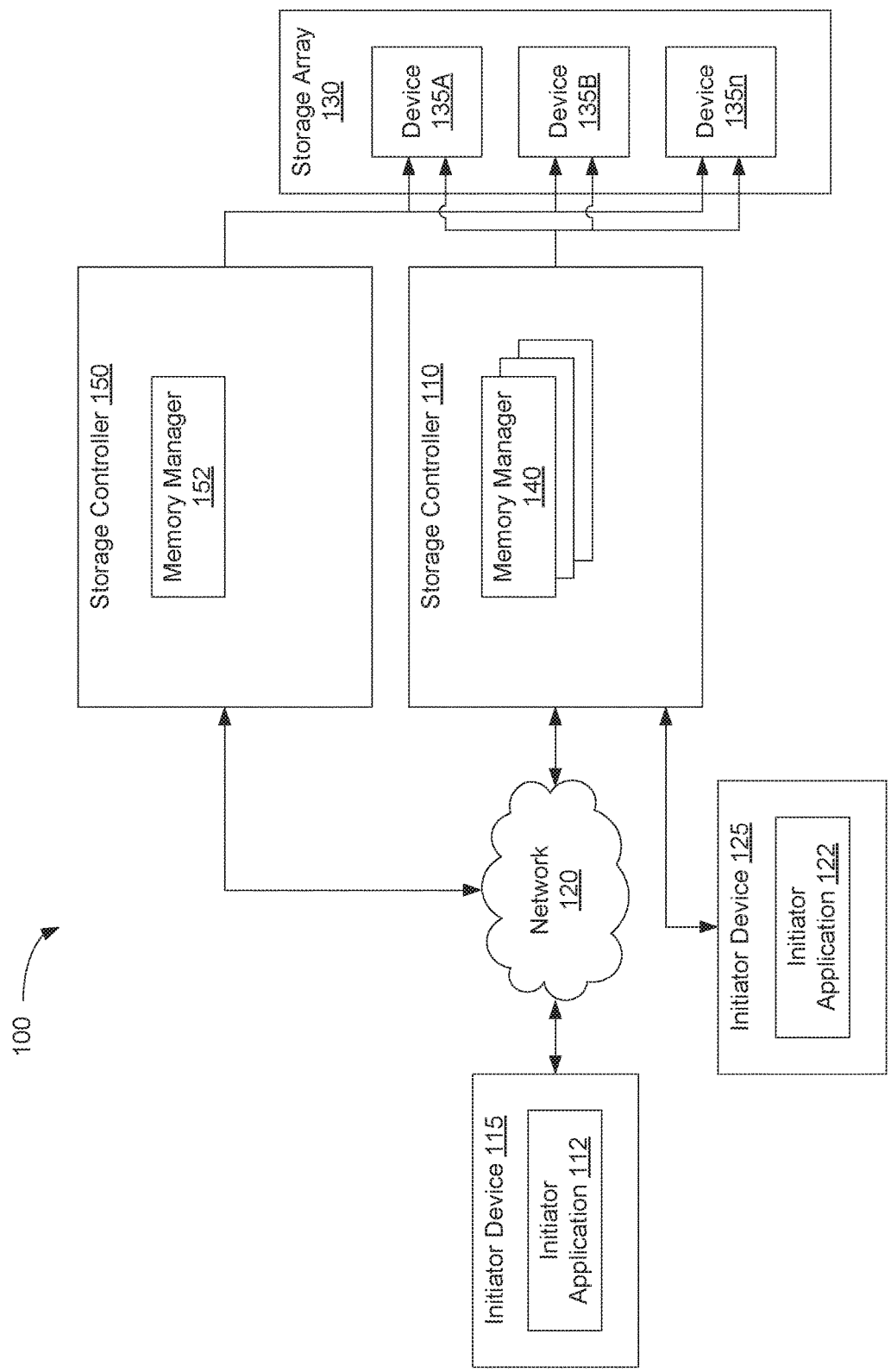
FIG. 1 is a block diagram illustrating a storage system in which embodiments of the present disclosure may be implemented.

Embodiments are described for efficient flash management for multiple controllers. In one embodiment, a memory manager module running on a storage controller utilizes physical block addressing rather than logical addressing to manage the data stored on the underlying storage devices in a connected storage array. The memory manager may abide by certain principles including having no preference for particular physical addresses, such that data does not have a "primary" location, "secondary" location, etc., but rather is just scattered randomly about the drive. Another principle of operations is not trying to write a "trickle" of tiny metadata updates because as the drive's state evolves, it may be best to use only the metadata persisted into flash blocks, along with periodically persisted data managed by the memory manager.

In one embodiment, the memory manager described herein achieves these principles by meeting at least three individual objectives. First, the memory manager allows a fast start of the primary storage controller by quickly locating recently-written flash blocks of one or more types of data. Second, the memory manager provides a list of flash blocks that are deallocated and ready for client writes. Third, the memory manager respects the needs of modern flash devices by delaying the erase of flash blocks until just before those blocks are needed for writing.

To accomplish the above objectives, the memory manager works in connection with firmware in the underlying storage devices. In one embodiment, the storage device firmware implements a metadata tracking scheme that stores certain values along with any data payload. These values may include a program/erase count for each data block that indicates a number of cycles during which the block has been written and erased, and a block type value, which may identify a storage client that owns the data in that block. In addition, the storage device firmware maintains a table or other data structure containing data for each data block and allows the memory manager to access the table. For each data block, the table also stores the program/erase count, the block type value, and a block status indicator (erased, written, unreadable, bad, etc.). On power-up of the storage device, the firmware may scan the data blocks to recover the embedded metadata and populate the data structure with the metadata recovered from those blocks.

The memory manager manages blocks in concert with a data structure called the "frontier set." The frontier set is a data structure that is written to flash that declares the state of a storage device in a way that allows future readers to determine not only what was true at that point in time, but also to recover the effect of operations that occurred after the frontier set was written to flash. The frontier set, in its most primitive form, is simply a list of block numbers and their corresponding program/erase counts. This is a declaration that at the moment the frontier set was created, block X was deallocated when its program/erase count was Y. The memory manager can use the frontier set to extrapolate the state of a block beyond the moment the frontier set was created and written. If block X was deallocated when its program/erase count was Y, the memory manager can make at least two logical conclusions. First, a future reader that finds block X still at program/erase count Y can conclude that block must still be deallocated. Second, a future reader that finds block X at some program/erase count Z>Y can conclude that some client must have written new data to that block, after this frontier set was created or updated.

As explained herein, these conclusions allow the memory manager to achieve the objectives described above. As long as the memory manager writes a new frontier set periodically (and sufficient blocks remain available), it is possible to allow the controller to discover known deallocated blocks that are ready for new writes. In addition, erases can be delayed until just before the blocks are rewritten because block deallocation will be "eventually consistent." This means that a deallocated block may not be seen as deallocated by all possible future primary controllers since it's possible that deallocated blocks may revert to the allocated state, until the next frontier set is persisted. Deallocated blocks are available for reuse, but until the moment that their new owner actually writes to them (which implies that the embedded metadata will include a new program/erase count and block type value), that block may revert back to its previous owner. Furthermore, a fast start of the primary controller is achieved by locating the leading edge of newly written data from a particular client. To assist a major client storing on the order of 100,000 to 1,000,000 blocks or more, the memory manager can define two classes of data, or more precisely, two states that a data block can be in. A "boot" block is one that contains new data and a "standalone" block contains cold data (i.e., data that has been around and untouched for a certain period of time). Boot blocks can be quickly and efficiently enumerated by memory manager to the client, after a crash or power loss. When the client no longer requires this block to be enumerated as a boot block, it will indicate this to the memory manager (a process referred to as "graduation"). This block will then become a standalone block at the memory manager's discretion.

FIG. 1 is a block diagram illustrating a storage system 100 in which embodiments of the present disclosure may be implemented. Storage system 100 may include storage controllers 110, 150 and storage array 130, which is representative of any number of data storage arrays or storage device groups. As shown, storage array 130 includes storage devices 135A-n, which are representative of any number and type of storage devices (e.g., solid-state drives (SSDs)). Storage controller 110 may be coupled directly to initiator device 125 and storage controller 110 may be coupled remotely over network 120 to initiator device 115. In one embodiment, storage controller 150 is coupled remotely over network 120 to initiator device 115. Initiator devices 115 and 125 are representative of any number of clients which may utilize storage controllers 110 and 150 for storing and accessing data in storage system 100. It is noted that some systems may include only a single client or initiator device, connected directly or remotely, to storage controllers 110 and 150.

In one embodiment, controller 110 is designated as the "primary" controller, which performs most or all of the I/O operations on the array 130. If, however, a software crash, hardware fault or other error occurs, the "secondary" controller 150 may be promoted to serve as the primary controller and take over all responsibilities for servicing the array 130. In one embodiment, storage controllers 110 and 150 are identical and any description of controller 110 herein may be equally attributed to storage controller 150.

Storage controller 110 may include software and/or hardware configured to provide access to storage devices 135A-n. Although storage controller 110 is shown as being separate from storage array 130, in some embodiments, storage controller 110 may be located within storage array 130. Storage controller 110 may include or be coupled to a base operating system (OS), a volume manager, and additional control logic, such as memory manager 140, for implementing the various techniques disclosed herein. In one embodiment, the OS is designed with flash storage in mind, so while it can use conventional SSDs to store data, it does not depend on a 512 byte random overwrite capability. Even on conventional SSDs, storage controller 110 can achieve better performance by writing and discarding data in large chunks. This style of I/O is sometimes called "flash friendly I/O." This also makes it a much easier task to convert the OS to use the physical addressing of storage devices, as compared to conventional filesystems.

In one embodiment, the logic of memory manager 140 is contained within an object which manages one of devices 135A-n. Thus, there may be a separate memory manager object for each device 135A-n in storage array 130. As new devices are connected to controller 110, new memory manager objects may be created. These objects may be similarly discarded when a corresponding device is disconnected from storage controller 110. Clients wishing to communicate with memory manager 140, such as one of initiator applications 112, 122, the operating system running on storage controller 110 or another client application running on storage controller 110, may do so via a memory manager application programming interface (API) published by memory manager 140. In one embodiment, multiple clients can access the same memory manager object concurrently. In one embodiment, storage controller 150 includes a separate instance(s) of memory manager 152.

Storage controller 110 may include and/or execute on any number of processing devices and may include and/or execute on a single host computing device or be spread across multiple host computing devices, depending on the embodiment. In some embodiments, storage controller 110 may generally include or execute on one or more file servers and/or block servers. Storage controller 110 may use any of various techniques for replicating data across devices 135A-n to prevent loss of data due to the failure of a device or the failure of storage locations within a device. Storage controller 110 may also utilize any of various deduplication techniques for reducing the amount of data stored in devices 135A-n by deduplicating common data.

In one embodiment, storage controller 110 may utilize logical volumes and mediums to track client data that is stored in storage array 130. A medium is defined as a logical grouping of data, and each medium has an identifier with which to identify the logical grouping of data. A volume is a single accessible storage area with a single file system, typically, though not necessarily, resident on a single partition of a storage device. The volumes may be logical organizations of data physically located on one or more of storage device 135A-n in storage array 130. Storage controller 110 may maintain a volume to medium mapping table to map each volume to a single medium, and this medium is referred to as the volume's anchor medium. A given request received by storage controller 110 may indicate at least a volume and block address or file name, and storage controller 110 may determine an anchor medium targeted by the given request from the volume to medium mapping table.

In one embodiment, storage controller 110 includes memory manager 140. Memory manager 140 can perform various operations to identify deallocated data blocks available for writing and to identify leading edge data that was most recently written by a particular client. In one embodiment, memory manager 140 can receive a request to write data to a storage device 135A and can determine a first data block on storage device 135A comprising a list of deallocated data blocks. That list may include a block number of each deallocated data block and an access operation count value (e.g., program/erase count value) at which each deallocated data block was deallocated. Memory manager 140 can then identify a second data block from the list of deallocated data blocks and write the requested data to that second data block. To identify the leading edge data, memory manager 140 may access a data structure stored in memory on storage device 135A, where the data structure stores block metadata for each data block on storage device 135A. Memory manager 140 may determine, from the data structure, a first data block on storage device 135A comprising a list of deallocated data blocks on the storage device and compare a first access operation count value associated with each of the deallocated data blocks from the data structure to a second access operation count value associated with each of the deallocated data blocks from the list of deallocated data blocks. Memory manager 140 may label a second data block on the list as comprising new data responsive to the first access operation count value associated with the second data block from the data structure not matching the second access operation count value associated with the second data block from the list of deallocated data blocks.

In various embodiments, multiple mapping tables may be maintained by storage controller 110. These mapping tables may include a medium mapping table and a volume to medium mapping table. These tables may be utilized to record and maintain the mappings between mediums and underlying mediums and the mappings between volumes and mediums. Storage controller 110 may also include an address translation table with a plurality of entries, wherein each entry holds a virtual-to-physical mapping for a corresponding data component. This mapping table may be used to map logical read/write requests from each of the initiator devices 115 and 125 to physical locations in storage devices 135A-n. A "physical" pointer value may be read from the mappings associated with a given medium during a lookup operation corresponding to a received read/write request. The term "mappings" is defined as the one or more entries of the address translation mapping table which convert a given medium ID and block number into a physical pointer value. This physical pointer value may then be used to locate a physical location within the storage devices 135A-n. The physical pointer value may be used to access another mapping table within a given storage device of the storage devices 135A-n. Consequently, one or more levels of indirection may exist between the physical pointer value and a target storage location.

In alternative embodiments, the number and type of client computers, initiator devices, storage controllers, networks, storage arrays, and data storage devices is not limited to those shown in FIG. 1. At various times one or more clients may operate offline. In addition, during operation, individual client computer connection types may change as users connect, disconnect, and reconnect to storage system 100. Further, the systems and methods described herein may be applied to directly attached storage systems or network attached storage systems and may include a host operating system configured to perform one or more aspects of the described methods. Numerous such alternatives are possible and are contemplated.

Network 120 may utilize a variety of techniques including wireless connections, direct local area network (LAN) connections, wide area network (WAN) connections such as the Internet, a router, storage area network, Ethernet, and others. Network 120 may comprise one or more LANs that may also be wireless. Network 120 may further include remote direct memory access (RDMA) hardware and/or software, transmission control protocol/internet protocol (TCP/IP) hardware and/or software, router, repeaters, switches, grids, and/or others. Protocols such as Fibre Channel, Fibre Channel over Ethernet (FCoE), iSCSI, and so forth may be used in network 120. The network 120 may interface with a set of communications protocols used for the Internet such as the Transmission Control Protocol (TCP) and the Internet Protocol (IP), or TCP/IP. In one embodiment, network 120 represents a storage area network (SAN) which provides access to consolidated, block level data storage. The SAN may be used to enhance the storage devices accessible to initiator devices so that the devices 135A-n appear to the initiator devices 115 and 125 as locally attached storage.

Initiator devices 115 and 125 are representative of any number of stationary or mobile computers such as desktop personal computers (PCs), servers, server farms, workstations, laptops, handheld computers, servers, personal digital assistants (PDAs), smart phones, and so forth. Generally speaking, initiator devices 115 and 125 include one or more processing devices, each comprising one or more processor cores. Each processor core includes circuitry for executing instructions according to a predefined general-purpose instruction set. For example, the x86 instruction set architecture may be selected. Alternatively, the ARM®, Alpha®, PowerPC®, SPARC®, or any other general-purpose instruction set architecture may be selected. The processor cores may access cache memory subsystems for data and computer program instructions. The cache subsystems may be coupled to a memory hierarchy comprising random access memory (RAM) and a storage device.

In one embodiment, initiator device 115 includes initiator application 112 and initiator device 125 includes initiator application 122. Initiator applications 112 and 122 may be any computer application programs designed to utilize the data on devices 135A-n in storage array 130 to implement or provide various functionalities. Initiator applications 112 and 122 may issue requests to read or write data from certain logical volumes data within storage system 100. Those requests can be serviced by memory manager 140 of storage controller 110, as described in detail herein.

Figure 2:
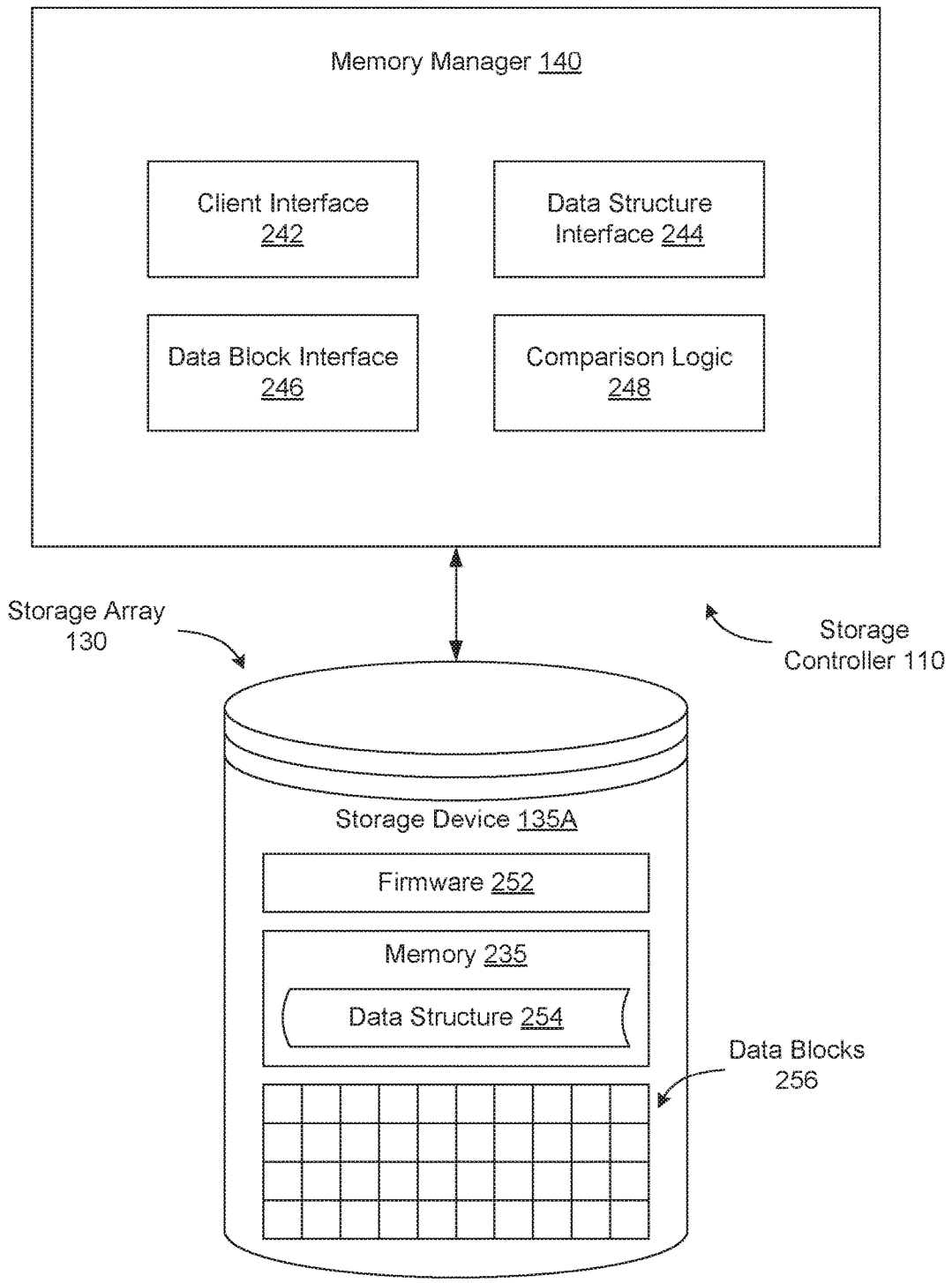
FIG. 2 is a block diagram illustrating a memory manager in a storage controller, according to an embodiment.

FIG. 2 is a block diagram illustrating memory manager 140 in a storage controller 110, according to an embodiment. In one embodiment, memory manager 140 includes client interface 242, data structure interface 244, data block interface 246 and comparison logic 248. This arrangement of modules may be a logical separation, and in other embodiments, these modules, interfaces or other components can be combined together or separated in further components. In one embodiment, storage device 135A is connected to memory manager 140 and includes firmware 252, memory 235 storing data structure 254, and data blocks 256. In one embodiment, storage device 135A may be external to storage controller 110 as part of storage array 130 and may be connected to storage controller 110 over a network or other connection. In other embodiments, storage controller 110 may include different and/or additional components which are not shown to simplify the description. Storage device 135A may include one or more mass storage devices which can include, for example, flash memory or solid-state drives (SSDs). Memory 235 may include for example, random-access memory (RAM); dynamic random-access memory (DRAM); erasable programmable memory (e.g., EPROM and EEPROM); flash memory; or any other type of storage medium. In one embodiment, storage device 135A includes volatile memory 235, such as DRAM, and non-volatile data blocks 256, such as flash blocks or other persistent data blocks.

In one embodiment, client interface 242 manages communication with client devices or applications in storage system 100, such as initiator devices 115 or 125, or applications within storage controller 110. Client interface 242 can receive I/O requests to access data blocks 256 on storage device 135A from an initiator application 112 or 122 over network 120. In one embodiment, the I/O request includes a request to write new data to storage device 135A. After the write is performed, client interface may provide a notification to initiator device 115 or 125 over network 120 indicating that the write was successfully performed.

In one embodiment, data structure interface 244 interacts with data structure 254 in memory 235 on storage device 135A. In response to client interface 242 receiving a write request, for example, data structure interface 244 may access data structure 254 (e.g., a dynamic table) comprising block metadata for each of data blocks 256 on storage device 135A. The block metadata may include an indication of a block type of each data block 256 and an access operation count value for each data block 256. In one embodiment, the access operation count value is a total number of program/erase cycles that have been performed on the block. Using the block type indicator, data structure interface 244 may determine a first data block on storage device 135A which stores a list of deallocated data blocks on storage device 135A. This list may include a block number of each deallocated data block and an access operation count value at which each deallocated data block was deallocated.

In one embodiment, data block interface 246 interacts with data blocks 256 of storage device 135A as part of any data access operations being performed. For example, once data structure interface 244 determines the block storing the list of deallocated data blocks, data block interface 246 may identify a second block of those deallocated blocks from the list, and read an access operation count value associated with the second block from the list. If memory manager 140 ultimately determines that the second block was in fact deallocated, data block interface 246 may perform the requested write operation by overwriting the old data in the second data block with new data. If the allegedly deallocated data block was not actually deallocated (or has since been reallocated), data block interface 246 can remove the second data block from the list stored in the first data block. When memory manager 140 is attempting to locate leading edge data, data block interface 246 can determine whether a particular block was previously labeled as comprising new data. In addition, once memory manager 140 identifies the leading edge data, data block interface 246 can label the data blocks as comprising either new or old data, as appropriate.

In one embodiment, comparison logic 248 performs various calculations and comparisons as part of the operations performed by memory manager 140. For example, to verify that a block appearing on the list of deallocated data blocks is in fact deallocated or to determine whether a block is storing new or old data, comparison logic 248 may compare a first access operation count value associated with the data block from data structure 254 to a second access operation count value associated with the data block from the list of deallocated data blocks stored in one of data blocks 256 (identified by the block type value). If comparison logic 248 determines that the count values match, this indicates that the block has not been reallocated since it was added to the list of deallocated blocks and, thus, can either be labeled as storing old data or can safely be overwritten without losing any critical data. If the count values don't match, however, this indicates that another client has written data to that block and it should be removed from the list of deallocated blocks and/or labeled as comprising new data.

Figure 3:
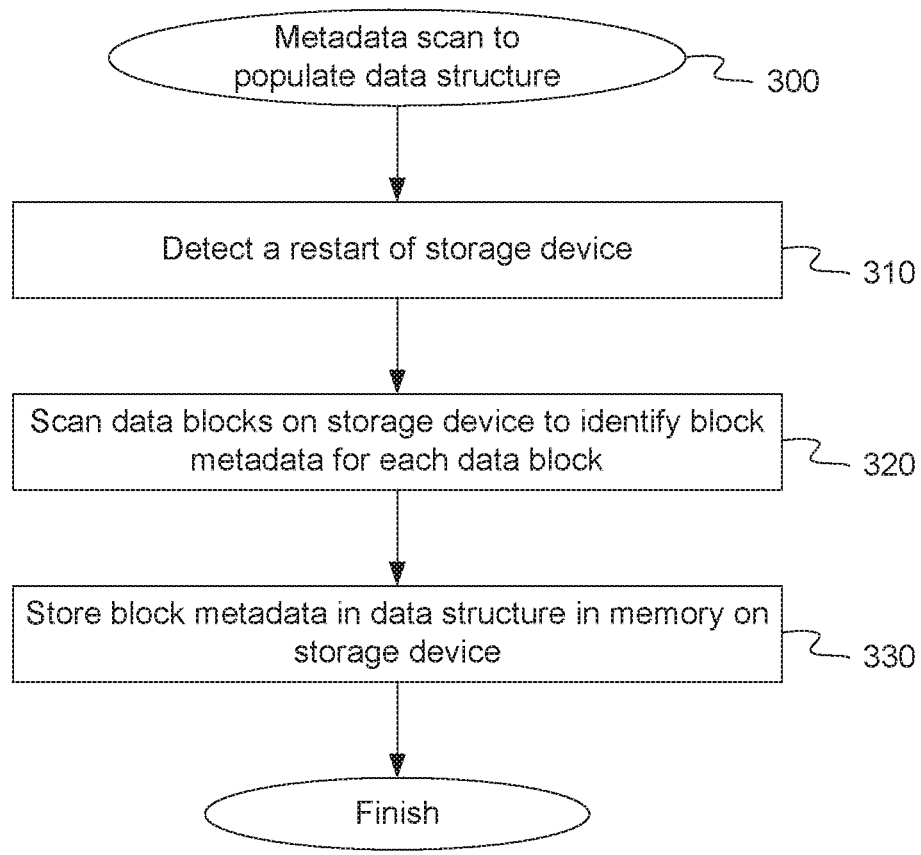
FIG. 3 is a flow diagram illustrating a method for performing a metadata scan to populate a data structure, according to an embodiment.

FIG. 3 is a flow diagram illustrating a method for performing a metadata scan to populate a data structure, according to an embodiment. The method 300 may be performed by processing logic that comprises hardware (e.g., circuitry, dedicated logic, programmable logic, microcode, etc.), software (e.g., instructions run on a processing device to perform hardware simulation), firmware, or a combination thereof. On power-up of the storage device 135A, the method 300 may scan the data blocks 256 to recover the embedded metadata and populate the data structure 254 with the metadata recovered from those blocks. In one embodiment, method 300 may be performed by the firmware 252 of storage device 135A, as shown in FIG. 2.

Referring to FIG. 3, at block 310, method 300 detects a restart of storage device 135A. After an event, such as a sudden power loss or software crash, storage device 135A may be automatically restarted. Firmware 252 can detect the restart and initiate any number of start-up procedures. Storage system 100 is designed to be extremely reliable even in the face of hardware or software failures, including sudden power losses or software crashes. Storage devices 135A-n may be designed with failures in mind, specifically to account for sudden crashes or power loss at any point during the process, and to assure that restarting after such an event is no different than any other restart operation.

At block 320, method 300 scans a plurality of data blocks 256 on storage device 135A to identify block metadata for each of the plurality of data blocks 256. In one embodiment, firmware 252 may scan each of the data blocks 256 to recover the embedded metadata. This metadata may include, for example, an indication of a block type of each of the data blocks 256 and an access operation count value for each of the data blocks 256. In one embodiment, this metadata may be stored in a header section of each individual block 256, so that it can be obtained quickly and efficiently. In one embodiment, the scan is reasonably fast (e.g., taking less than 10 seconds to scan one million or more blocks).

At block 330, method 300 stores the block metadata in data structure 254 stored in memory 235 on storage device 135A, wherein the block metadata is accessible by storage controller 110 coupled to storage device 135A. In one embodiment, data structure 254 comprises a plurality of entries, each of the entries corresponding to a different one of the data blocks 256 on storage device 135A. In one embodiment, data structure 254 maintains an indication of a block type and an access operation count value for each data block. One example of a block type that may be stored in metadata is a "bootstrap data" block. This block type stores data that is needed to restart the system after a power loss or other failure. Since the data blocks 256 may have limited reusability (e.g., approximately three thousand program/erase cycles), this data cannot be stored in the same place since it gets accessed regularly. Since the bootstrap data can be located easily during the metadata scan, it can be located anywhere on storage device 135A.

Data storage on flash follows a simple looking cycle: erase, program; erase, program. Once written or programmed, data is nonvolatile and may be read millions of times. Flash structures have a complex hierarchy (i.e., packages, dies, planes, blocks, pages, and bits). The memory manager 140 described herein operates primarily on the block level. This is because the block is the most common unit of erase and reuse. If a particular flash chip uses 16 MB blocks, then data will be written to flash in 16 MB chunks, and will be discarded in 16 MB chunks. One physical detail of NAND flash that becomes important is that the physical blocks and pages have some "extra" storage beyond the expected powers of two. Thus, a physical 16 KB block may actually contain 19 KB of physical bits. While most of these "extra" bits are consumed by error correction codes, there may be some room left over to store metadata about the block or its contents. Storage system 100 makes use of some of these bits to store metadata alongside any data stored by the controller.

There are a number of management tasks performed by any system that stores data on NAND flash chips. Normally these functions are all performed in SSD firmware and are concealed from the host computer. Flash chips have a limited lifespan, measured in program/erase (PE) cycles. Management software must spread data around such that flash blocks wear more or less evenly across the drive, or premature drive failure may result due to block failures. This may be referred to as "wear leveling." Flash is an imperfect media and blocks may fail spontaneously. Thus, in one embodiment, management software must maintain a bad block list over the lifetime of the drive. In addition, most SSDs support a storage interface that is backwards compatible with hard disks from the last 20+ years, allowing a contiguous range of logical 512 byte sectors that can be overwritten randomly an arbitrary number of times. Firmware supports this interface via a complicated abstraction layer that maps logical addresses to physical flash locations dynamically to provide logical address mapping. In one embodiment, wear leveling and bad block handling are not performed in firmware, but rather are handled within memory manager 140 of storage controller 110. Thus, the logical address feature may be discarded as only physical flash addresses are used.

Figure 4:
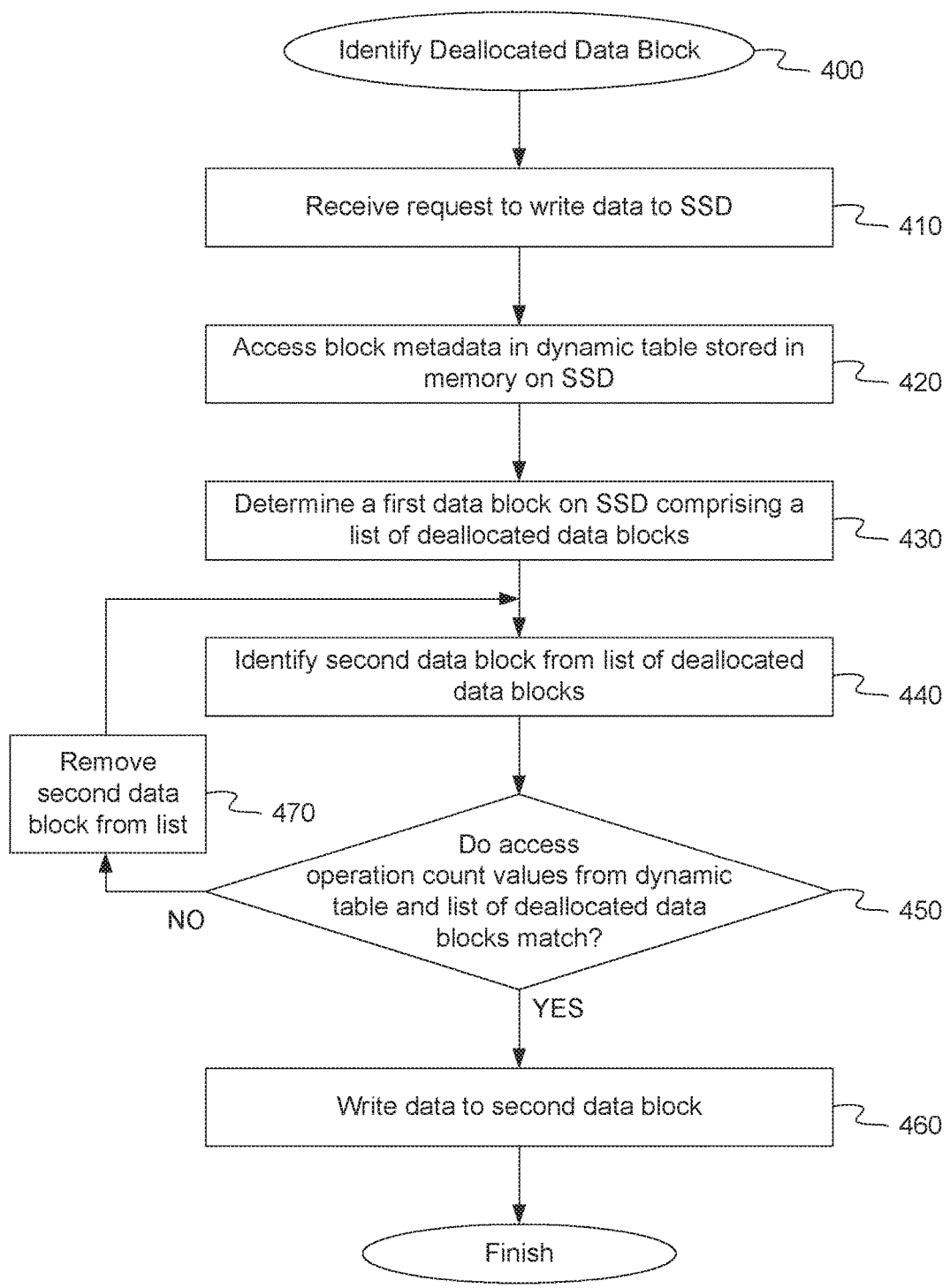
FIG. 4 is a flow diagram illustrating a method for identifying a deallocated data block on a storage device, according to an embodiment.

FIG. 4 is a flow diagram illustrating a method for identifying a deallocated data block on a storage device, according to an embodiment. The method 400 may be performed by processing logic that comprises hardware (e.g., circuitry, dedicated logic, programmable logic, microcode, etc.), software (e.g., instructions run on a processing device to perform hardware simulation), firmware, or a combination thereof. The method 400 can allow a storage controller to identify deallocated data blocks to allow those blocks to be overwritten without the risk of losing any critical data. In one embodiment, method 400 may be performed by memory manager 140, as shown in FIGS. 1 and 2.

Referring to FIG. 4, at block 410, method 400 receives a request to write data to storage device 135A (e.g., a SSD). In one embodiment, client interface 242 receives the request from an initiator application 112 or 122 over network 120, or from another client application on storage controller 110. The write request may not specify a particular data block on storage device 135A, so it may be up to memory manager 140 to identify a deallocated block. Since data blocks 256 may not be erased until right before they are written, even a block currently storing data may be "deallocated" and, thus, available for writing.

At block 420, method 400 accesses a dynamic table (e.g., data structure 254) stored in memory 235 on storage device 135A, the dynamic table comprising block metadata for each data block 256 on storage device 135A. In one embodiment, data structure interface 244 may access data structure 254 comprising block metadata for each of data blocks 256 on storage device 135A. The block metadata may include an indication of a block type of each data block and an access operation count value for each data block.

At block 430, method 400 determines a first data block on storage device 135A comprising a list of deallocated data blocks on the storage device 135A. In one embodiment, data structure interface 244 determines the first data block from the dynamic table based on the indication of the block type of the first data block. Using the block type indicator stored in the dynamic table, data structure interface 244 may determine a first data block on storage device 135A which stores a list of deallocated data blocks on storage device 135A. This list may include a block number of each deallocated data block and an access operation count value at which each deallocated data block was deallocated. In one embodiment, this list may be referred to as the "frontier set" and the block where it is stored may be given a special block type. In one embodiment, the frontier set is identified and read once when storage device 135A is started-up (or restarted), and the list of deallocated blocks is stored and their corresponding operation count values are stored in memory 235.

At block 440, method 400 identifies a second data block from the list of deallocated data blocks on the storage device 135A. In one embodiment, data block interface 246 accesses the first block on storage device 135A identified at block 430 from the dynamic table. Data block interface 246 may identify a second block of those deallocated blocks from the list, and read an access operation count value associated with the second block from the list. In one embodiment, the second data block may be identified from the list of deallocated blocks stored in memory 235 some period of time after the frontier set is initially identified at block 430.

At block 450, method 400 compares a first access operation count value associated with the second data block from the dynamic table to a second access operation count value associated with the second data block from the list of deallocated data blocks. In one embodiment, comparison logic 248 compares the first access operation count value to the second access operation count value associated with the data block. If comparison logic 248 determines that the count values match, this indicates that the block has not been reallocated since it was added to the list of deallocated blocks. Thus, at block 460, method 400 writes the requested data to the second data block. In one embodiment, data block interface 246 overwrites the old data stored in the second data block with the newly requested data received at block 410. If the count values do not match, however, this indicates that another client has since written new data to that block. Thus, at block 470, data block interface 246 removes the second data block from the list of deallocated data blocks.

Figure 5:
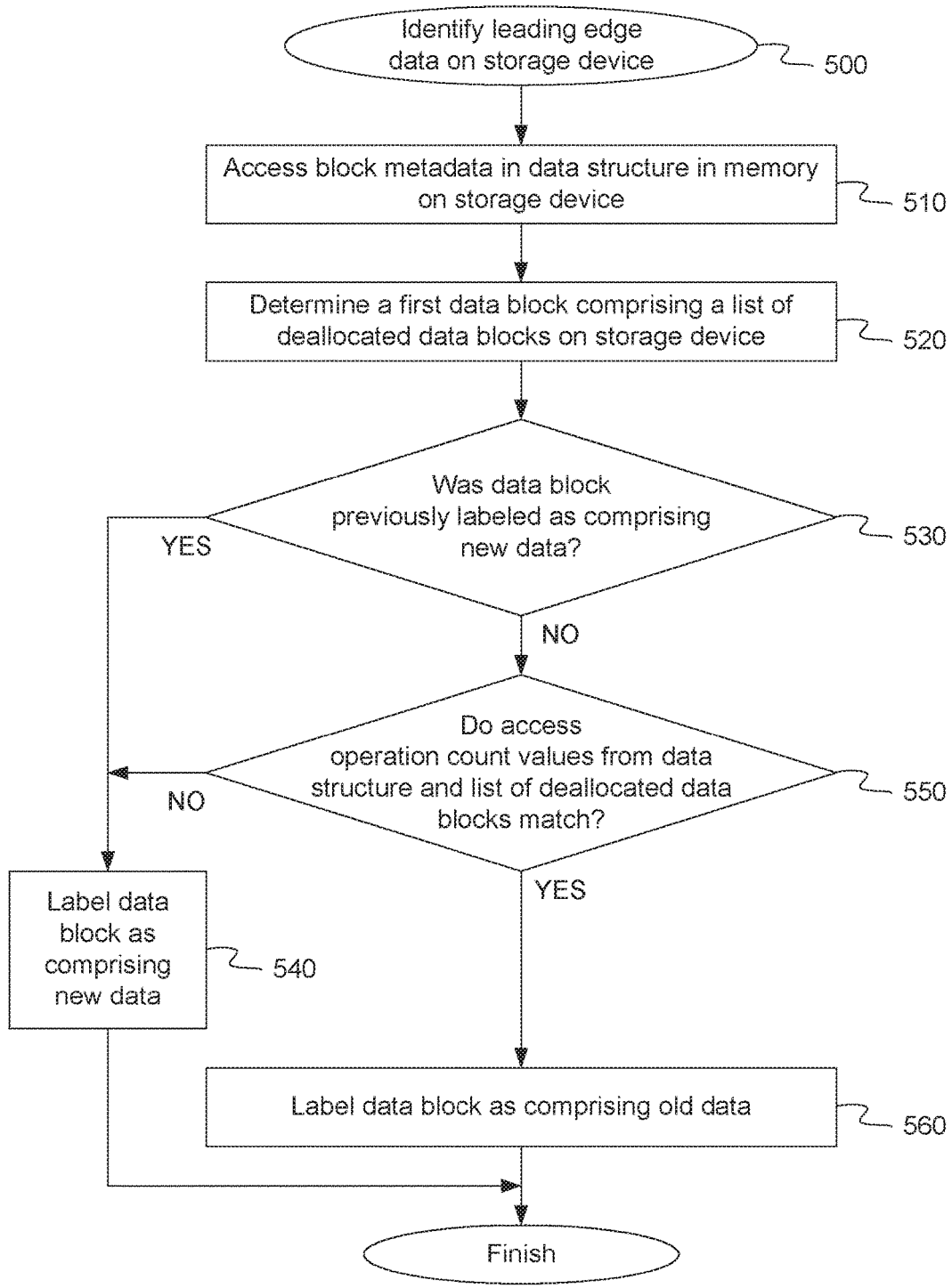
FIG. 5 is a flow diagram illustrating a method for identifying leading edge data on a storage device, according to an embodiment.

FIG. 5 is a flow diagram illustrating a method for identifying leading edge data on a storage device, according to an embodiment. The method 500 may be performed by processing logic that comprises hardware (e.g., circuitry, dedicated logic, programmable logic, microcode, etc.), software (e.g., instructions run on a processing device to perform hardware simulation), firmware, or a combination thereof. The method 500 can allow a storage controller to identify leading edge data that was most recently written to storage device 135A by a particular storage client. In one embodiment, method 500 may be performed by memory manager 140, as shown in FIGS. 1 and 2.

Referring to FIG. 5, at block 510, method 500 accesses data structure 254 in memory 235 on storage device 135A, the data structure 254 comprising block metadata for each data block 256 on storage device 135A. In one embodiment, data structure interface 244 may access data structure 254 comprising block metadata for each of data blocks 256 on storage device 135A. The block metadata may include an indication of a block type of each data block and an access operation count value for each data block.

At block 520, method 500 determines, from data structure 254, a first data block on storage device 135A comprising a list of deallocated data blocks on storage device 135A. In one embodiment, data structure interface 244 determines the first data block from the data structure 254 based on the indication of the block type of the first data block. Using the block type indicator stored in the data structure 254, data structure interface 244 may determine a first data block on storage device 135A which stores a list of deallocated data blocks on storage device 135A. This list may include a block number of each deallocated data block and an access operation count value at which each deallocated data block was deallocated and a state value indicating whether the block is known to be in use. The state value may be indicated as "boot" or "future," where a boot block is known to be in use (because it includes new data) and a future block was, at the time data structure 254 was populated, not in use (because it includes old data). In one embodiment, this list may be referred to as the "frontier set" and the block where it is stored may be given a special block type. The frontier set represents a snapshot in time and permits a future primary controller to correctly recover the state of the drive (and all the clients' data storage). A newly started primary controller can examine this frontier set, and compare the program/erase counts to those on the drive itself. "Future" blocks will become boot blocks if the program/erase count indicates new writes have occurred. "Boot" blocks will generally stay boot blocks, barring unusual events, such as flash errors, etc.

At block 530, method 500 determines whether a data block on the list of deallocated data blocks was previously labeled as comprising old data. In one embodiment, data block interface 246 reads the data from the first data block where the frontier set itself is stored, locates an entry in the frontier set corresponding to a second data block and reads the state value for that entry. As described above data blocks on storage device 135A comprising old data may be labeled as "future" blocks in the frontier set and data blocks comprising new data may be labeled as "boot" blocks in the frontier set.

If the block was previously labeled as comprising new data (i.e., labeled as "boot" blocks), at block 540, method 500 maintains the previous new data label. Thus, boot blocks stay labeled boot blocks, regardless of whether they have new writes.

If the block was previously labeled as comprising old data, at block 550, method 500 compares a first access operation count value associated with the deallocated data blocks from the data structure 254 to a second access operation count value associated with the deallocated data block from the list of deallocated data blocks. In one embodiment, comparison logic 248 compares the first access operation count value to the second access operation count value associated with the data block. If comparison logic 248 determines that the first access operation count value associated with the second data block from the data structure does not match the second access operation count value associated with the second data block from the list of deallocated data blocks, this indicates that the block has been written with new data since it was added to the list. Thus, at block 540, method 500 labels the second data block on the list as comprising new data. In one embodiment, data block interface 246 changes the state value in the entry of the frontier set corresponding to the data block to "boot." If the first access operation count value associated with the second data block from the data structure matches the second access operation count value associated with the second data block from the list of deallocated data blocks, however, this indicates that no new data has been written to that block. Thus, at block 560, method 500 labels the second data block on the list as comprising old data. In one embodiment, data block interface 246 maintains the state value in the entry of the frontier set corresponding to the data block as "future."

In one embodiment, standalone blocks are not tracked by the frontier set. Rather, they can be defined as "all the blocks not listed in the frontier set" (or marked bad). These blocks can be enumerated simply by searching the drive tables for blocks with the correct block type that are not covered by the current frontier set. It should also be noted that all newly allocated blocks may come from the list of blocks written in the frontier set. Otherwise the newly written data would not be detected as a boot block by a future primary controller. Furthermore, because boot blocks are be listed in the frontier set, there can be policy on clients with small storage needs that they will never use standalone blocks. This means that any blocks that contain data with that client's block type, but are not listed in the frontier set, have been deallocated, saving clients the bother of sifting through old data and deallocating those blocks.

Periodically, a new frontier set may be constructed and written to flash. This may be desirable if most of the deallocated blocks in the current frontier set have been exhausted. Writing a new frontier set can make additional blocks ready for allocation. In addition, if a particular client has written and then deallocated many blocks, a new frontier set may be created. In one embodiment, deallocations are not made permanent until a new frontier set is written. Thus, completing that write will limit the number of blocks a future primary will discover. This can affect failover time, so it may be advantageous to limit some clients' block usage. Failover includes the transfer of the "primary" designation from one controller to another, which includes the transfer of the functionality of memory manager 140. Furthermore, when some blocks with attractive (i.e., low) program/erase counts have become deallocated, for best wear leveling behavior, the system tries to use the blocks with the lowest program/erase count first. Persisting a new frontier set can make those more attractive blocks available.

A new frontier set may be constructed by selecting some new future blocks from the list of deallocated blocks and adding the list of known boot blocks. Blocks which were formerly boot blocks in the previous frontier set but have since been graduated may not be recorded in the new frontier set. While persisting a new frontier set, the system need not halt all client allocations and writes. The new frontier set is constructed to contain at least a small number of blocks that are also part of the previous frontier set (and are marked as "future" blocks). In this way the system can continue allocating blocks from this overlapping set, knowing that if it crashes or loses power at any time, memory manager 140 can safely start up using either the new set (assuming the new frontier set write completed) or the old set (if the write did not complete). Each new frontier set may be written to a flash block using a "frontier set" block type value. This assists in quickly locating the frontier set.

Because this design does not persist a new frontier set during every state change, there may be an accumulation of changes that have only taken effect inside the controller memory. These changes can be lost if a failover or power loss occurs. It is possible to lose block deallocations and graduations across these events, however, this does not affect the correctness of the controller application, as it is straightforward to simply repeat these actions on the new primary controller. It is also possible to lose a block allocation if the client did not write to the block in question before the failover or restart. In one embodiment, this problem is alleviated as whatever task that intended to write something will be repeated on the new primary controller and may allocate a new block without being aware that a previous primary controller was attempting a similar operation.

In one embodiment, the storage device firmware 252 provides a list of blocks containing data of a particular block type to memory manager 140. This reduces the work required to locate the frontier set, and allows faster primary controller startup. When writing the frontier set, memory manager 140 also takes the unusual step of physically erasing old copies of frontier sets. This allows faster startup time by ensuring that controller 110 does not have to sift through many old frontier sets looking for the current one. To ensure correct behavior across a surprise block failure, frontier sets may be written to at least two physical locations, preferably spread across different failure domains (e.g. flash dies) to minimize the chance that both fail simultaneously. In one embodiment, the encryption capabilities of storage device firmware 252 are customized such that the data structures needed during startup (e.g. the frontier set) can be written unencrypted, and most client data can be written encrypted.

Figure 6:
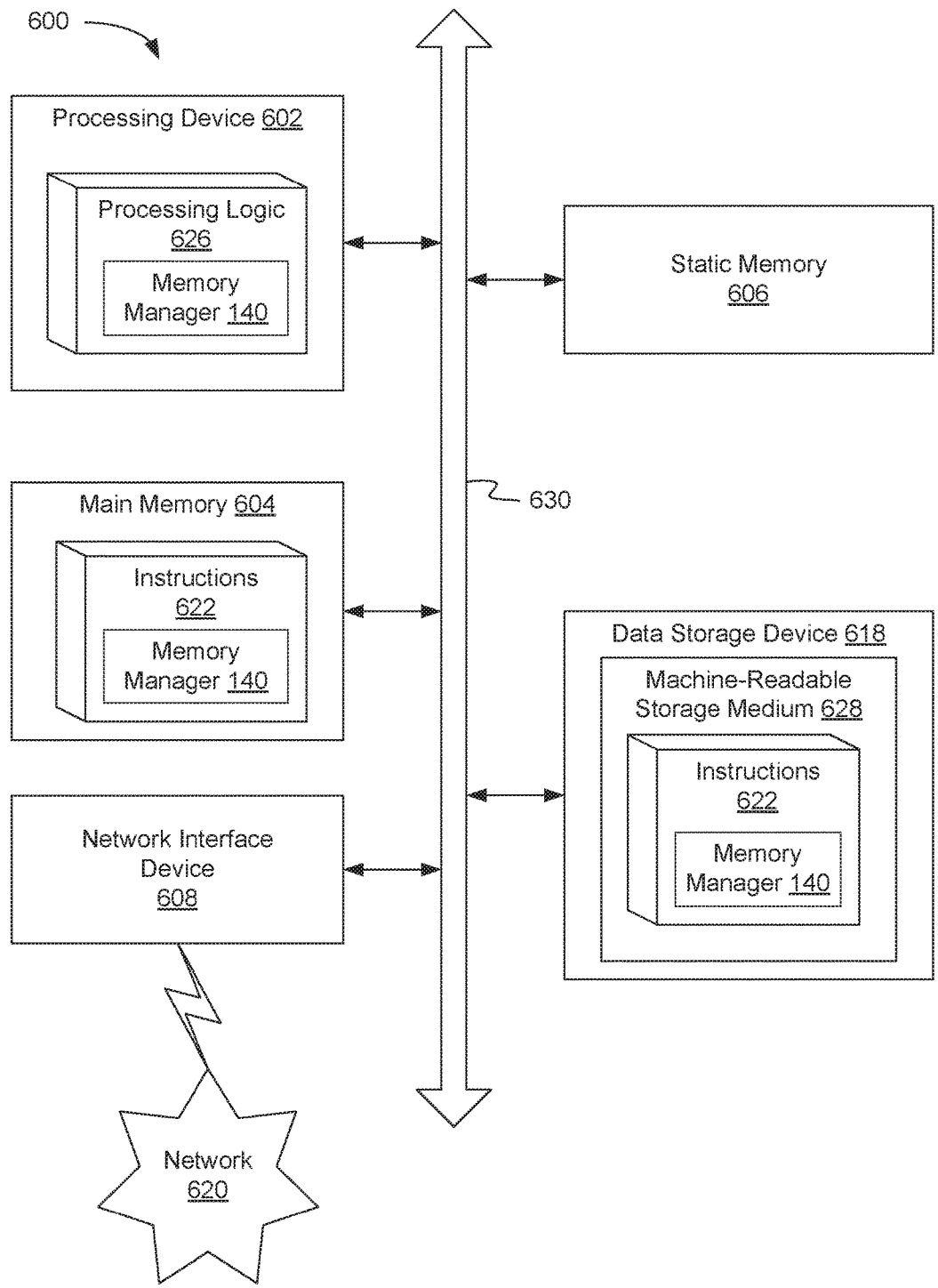
FIG. 6 is a block diagram illustrating an exemplary computer system, according to an embodiment.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 600 may be representative of a server, such as storage controller 110 running memory manager 140 or of a client, such as initiator devices 115 or 125.

The exemplary computer system 600 includes a processing device 602, a main memory 604 (e.g., read-only memory (ROM), flash memory, dynamic random access memory (DRAM), a static memory 606 (e.g., flash memory, static random access memory (SRAM), etc.), and a data storage device 618, which communicate with each other via a bus 630. Data storage device 618 may be one example of any of the storage devices 135A-n in FIGS. 1 and 2. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 602 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute processing logic 626, which may be one example of memory manager 140 shown in FIGS. 1 and 2, or of initiator application 112 or 122, for performing the operations and steps discussed herein.

The data storage device 618 may include a machine-readable storage medium 628, on which is stored one or more set of instructions 622 (e.g., software) embodying any one or more of the methodologies of functions described herein, including instructions to cause the processing device 602 to execute virtual copy logic 140 or initiator application 112 or 122. The instructions 622 may also reside, completely or at least partially, within the main memory 604 and/or within the processing device 602 during execution thereof by the computer system 600; the main memory 604 and the processing device 602 also constituting machine-readable storage media. The instructions 622 may further be transmitted or received over a network 620 via the network interface device 608.

The machine-readable storage medium 628 may also be used to store instructions to perform a method for efficient flash management for multiple controllers, as described herein. While the machine-readable storage medium 628 is shown in an exemplary embodiment to be a single medium, the term "machine-readable storage medium" should be taken to include a single medium or multiple media (e.g., a centralized or distributed database, and/or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

In situations in which the systems discussed herein collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the media server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the web server or media server.

Reference throughout this specification to "one embodiment" or "an embodiment" means that a particular feature, structure, or characteristic described in connection with the embodiments included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or".

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

What is claimed is:

1. A non-transitory computer readable storage medium storing instructions, which when executed, cause a processing device to:
   access a data structure stored in memory on a storage device, the data structure comprising block metadata for each data block on the storage device, wherein the block metadata comprises an indication of a block type of each data block on the storage device and an access operation count value for each data block on the storage device;
   determine, from the data structure, a first data block on the storage device comprising a list of deallocated data blocks on the storage device, the list comprising a block number of each deallocated data block and an access operation count value at which each deallocated data block was deallocated; and
   compare, by the processing device, a first access operation count value associated with each of the deallocated data blocks from the data structure to a second access operation count value associated with each of the deallocated data blocks from the list of deallocated data blocks;
   determine that a second data block on the list was previously labeled as comprising old data;
   label the second data block on the list as comprising new data responsive to the first access operation count value associated with the second data block from the data structure not matching the second access operation count value associated with the second data block from the list of deallocated data blocks; and
   label the second data block on the list as comprising old data responsive to the first access operation count value associated with the second data block from the data structure matching the second access operation count value associated with the second data block from the list of deallocated data blocks.

2. The non-transitory computer readable storage medium of claim 1, wherein to determine the first data block on the storage device, the processing device to identify the first data block from the data structure based on the indication of the block type of the first data block.

3. A non-transitory computer readable storage medium storing instructions, which when executed, cause a processing device to:
   access a data structure stored in memory on a storage device, the data structure comprising block metadata for each data block on the storage device, wherein the block metadata comprises an indication of a block type of each data block on the storage device and an access operation count value for each data block on the storage device;
   determine, from the data structure, a first data block on the storage device comprising a list of deallocated data blocks on the storage device, the list comprising a block number of each deallocated data block and an access operation count value at which each deallocated data block was deallocated; and
   compare, by the processing device, a first access operation count value associated with each of the deallocated data blocks from the data structure to a second access operation count value associated with each of the deallocated data blocks from the list of deallocated data blocks
   determine that a second data block on the list was previously labeled as comprising new data; and
   maintain a label of the second data block on the list as comprising new data responsive to the first access operation count value associated with the second data block from the data structure matching the second access operation count value associated with the second data block from the list of deallocated data blocks.

4. The non-transitory computer readable storage medium of claim 3, wherein the storage device comprises a solid-state drive (SSD).

5. A system comprising:
   a storage array comprising a solid state drive; and
   a storage controller coupled to the storage array, the storage controller comprising a processing device, the processing device to:
      access a data structure stored in memory on a storage device, the data structure comprising block metadata for each data block on the storage device, wherein the block metadata comprises an indication of a block type of each data block on the storage device and an access operation count value for each data block on the storage device;
      determine, from the data structure, a first data block on the storage device comprising a list of deallocated data blocks on the storage device, the list comprising a block number of each deallocated data block and an access operation count value at which each deallocated data block was deallocated; and
      compare, by the processing device, a first access operation count value associated with each of the deallocated data blocks from the data structure to a second access operation count value associated with each of the deallocated data blocks from the list of deallocated data blocks;
      determine that a second data block on the list was previously labeled as comprising new data; and
      maintain a label of the second data block on the list as comprising new data responsive to the first access operation count value associated with the second data block from the data structure matching the second access operation count value associated with the second data block from the list of deallocated data blocks.

6. The system of claim 5, wherein the storage device comprises a solid-state drive (SSD).

* * * * *